(12) United States Patent
Raghavan et al.

(10) Patent No.: US 11,626,908 B2
(45) Date of Patent: Apr. 11, 2023

(54) TECHNIQUES FOR ANTENNA SELECTION IN NON-CO-LOCATED DUAL-POLARIZED ANTENNA ARRAYS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Kobi Ravid, Closter, NJ (US); Robert Douglas, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/138,373

(22) Filed: Dec. 30, 2020

(65) Prior Publication Data
US 2022/0209832 A1 Jun. 30, 2022

(51) Int. Cl.
*H04B 7/0456* (2017.01)
*H04B 7/0417* (2017.01)
*H04B 7/0452* (2017.01)
*H04B 7/06* (2006.01)

(52) U.S. Cl.
CPC ......... *H04B 7/0469* (2013.01); *H04B 7/0417* (2013.01); *H04B 7/0452* (2013.01); *H04B 7/0628* (2013.01)

(58) Field of Classification Search
CPC .. H04B 7/0469; H04B 7/0417; H04B 7/0452; H04B 7/0628; H04B 7/061; H04B 7/0486; H04B 7/10; H04B 7/063
See application file for complete search history.

(56) References Cited

U.S. PATENT DOCUMENTS

| 2013/0235825 A1* | 9/2013 | Walton | H04L 25/0242 370/329 |
| 2018/0278309 A1* | 9/2018 | Raghavan | H04W 72/14 |
| 2020/0314934 A1 | 10/2020 | Raghavan et al. | |
| 2021/0314111 A1* | 10/2021 | Hadani | H04L 27/10 |

FOREIGN PATENT DOCUMENTS

| WO | 2020005294 A1 | 1/2020 |
| WO | 2021150317 A1 | 7/2021 |

OTHER PUBLICATIONS

International Search Report and Written Opinion—PCT/US2021/062651—ISA/EPO—dated Apr. 7, 2022.

* cited by examiner

*Primary Examiner* — Vineeta S Panwalkar
(74) *Attorney, Agent, or Firm* — Arent Fox, LLP

(57) ABSTRACT

Aspects described herein relate to determining a condition related to at least one of a thermal condition at the first device or receiving, at the first device, rate or diversity parameters reported to the first device by a second device, modifying, based on determining the condition, a configuration of a set of antenna elements from at least one antenna panel to use in wireless communication, and communicating with one or more devices using the modified configuration of the set of antenna elements from the at least one antenna panel.

28 Claims, 10 Drawing Sheets

TECHNIQUES FOR ANTENNA SELECTION IN NON-CO-LOCATED DUAL-POLARIZED ANTENNA ARRAYS

BACKGROUND

Aspects of the present disclosure relate generally to wireless communication systems, and more particularly, to performing antenna selection for antenna arrays in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a device, such as a base station, may be equipped with large antenna arrays to provide high signal gain in communicating with other devices, such as multiple user equipment (UEs).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication by a first device is provided. The method includes determining a condition related to at least one of a thermal condition at the first device or receiving, at the first device, rate or diversity parameters reported to the first device by a second device, modifying, based on determining the condition, a configuration of a set of antenna elements from at least one antenna panel to use in wireless communication, and communicating with one or more devices using the modified configuration of the set of antenna elements from the at least one antenna panel.

According to another aspect, a method for wireless communication at a first device is provided. The method includes reporting, to a second device, at least one of rate or diversity parameters for communications from the first device to cause modification of a configuration of a set of antenna elements from at least one antenna panel at the second device, and communicating with the second device based on the configuration of the set of antenna elements from the at least one antenna panel as modified.

In another example, an apparatus for wireless communication is provided that includes a set of antenna elements across multiple antenna panels including one or more sets of co-located dual-polarized antenna elements and one or more sets of non-co-located dual-polarized antenna elements, a transceiver coupled to the set of antenna elements, a memory configured to store instructions, and one or more processors communicatively coupled with the memory and the transceiver. The one or more processors are configured to determine a condition related to at least one of a thermal condition at the apparatus or receiving, at the apparatus, rate or diversity parameters reported to the apparatus by a device, modify, based on determining the condition, a configuration of the set of antenna elements from at least one antenna panel of the multiple antenna panels to use in wireless communication, and communicate with one or more devices using the modified configuration of the set of antenna elements from the at least one antenna panel.

In a further example, an apparatus for wireless communication is provided that includes a transceiver, a memory configured to store instructions, and one or more processors communicatively coupled with the memory and the transceiver. The one or more processors are configured to report, to a device, at least one of rate or diversity parameters for communications from the apparatus to cause modification of a configuration of a set of antenna elements from at least one antenna panel at the device, and communicate with the device based on the configuration of the set of antenna elements from the at least one antenna panel as modified.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
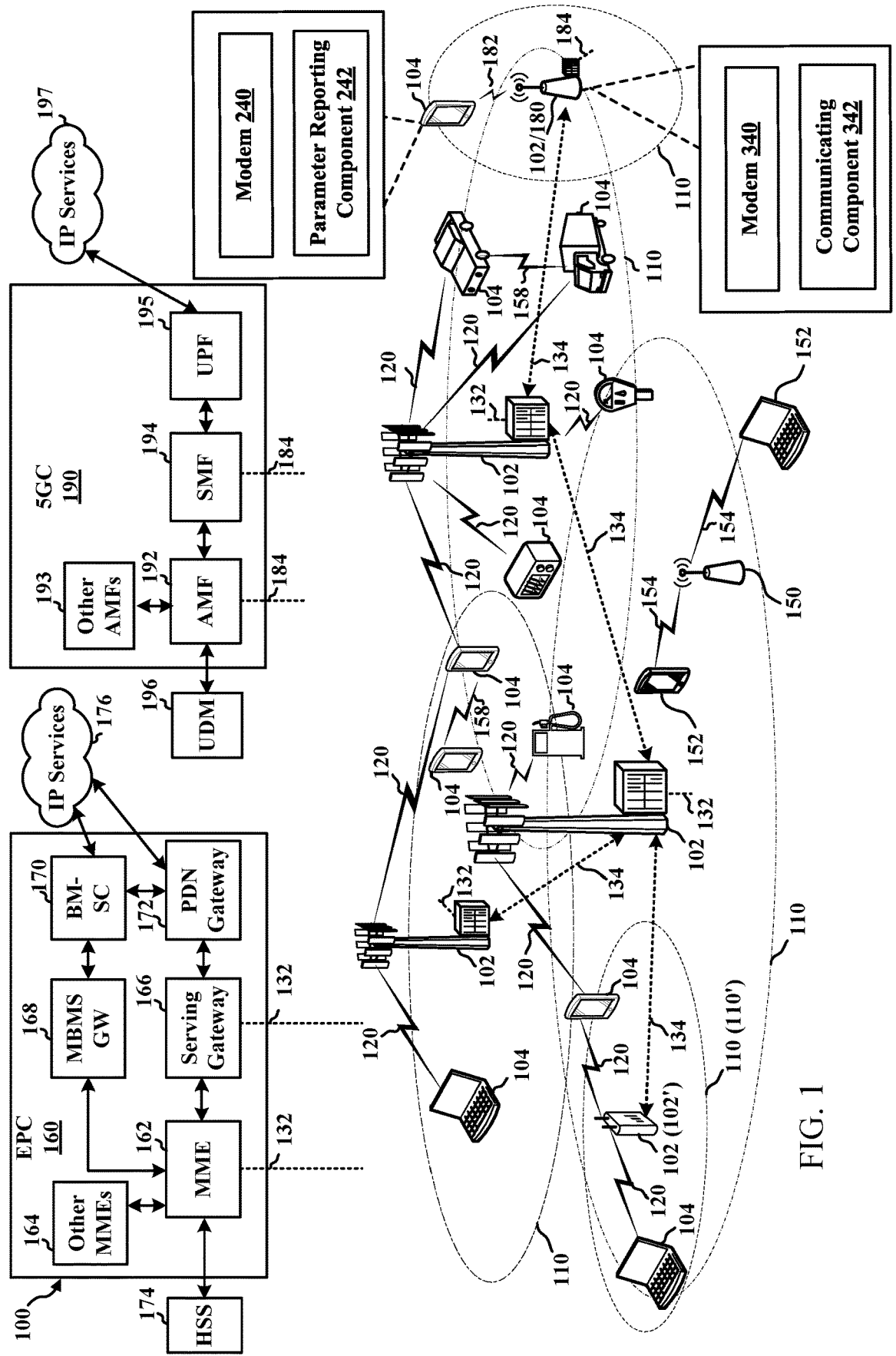
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing antenna selection including non-co-located polarized antenna arrays. In some wireless communication technologies, such as fifth generation (5G) new radio (NR), a base station can typically have a co-located dual-polarized antenna array, which can include a matrix-like setup of dual-polarized patch antenna elements with either uniform or non-uniform inter-antenna element spacing, such as one or more 32-by-four matrices of antenna elements. Such antenna arrays can allow for achieving enhanced polarization multiple-input multiple-output (MIMO) gains, which can be used in the second wave of millimeter wave deployments at frequency range 2 (FR2) defined in 5G NR, and may be used in FR4 (e.g., 52.6-114.25 gigahertz) and beyond. As more antenna elements are used, feedline crossings can become more complicated or difficult to avoid. For example, hardware design can become more difficult, impedance matching can become more difficult, antenna efficiencies can decrease, etc. One possible solution can be to use non-co-located polarizations that avoid feedline crossings.

For example, some advantages of non-co-located arrays over co-located arrays can include that non-co-located arrays can allow a better thermal management than co-located arrays as the antenna elements are distinct, non-co-located arrays can allow for easier designs as feedline crossings are minimized (especially important for large antenna arrays), non-co-located arrays can be more uncorrelated than co-located arrays (e.g., coupling across antenna layers can be less), which can allow for non-polarization/spatial multiple-input multiple-output (MIMO) gains. Some disadvantages of non-co-located arrays as compared to co-located arrays can include that non-co-located arrays can consume more area and thus more printed circuit board (PCB) material than co-located arrays, radiated testing in the chamber such as those used for compliance and regulatory aspects can be difficult for non-co-located arrays due to centers of antenna arrays being different, depending on size of array, non-co-located arrays can be excited by same/different clusters in the channel differently, which can lead to perhaps some diminished polarization MIMO gains, co-located arrays may be better for co-phasing of signals across two polarizations (e.g., rank-one operation), for smaller/moderate sized arrays, imbalance between layers due to ground and housing could be higher for non-co-located arrays due to the location of the arrays on ground and housing.

Due to the various advantages and disadvantages of each antenna configuration, it may be desirable for a base station to include both a first configuration of one or more co-located dual-polarized antenna arrays and a second configuration of one or more non-co-located dual-polarized antenna arrays. The base station can perform antenna switching between configurations in certain scenarios and/or based on certain detected events, triggers, parameter values, etc., as described herein. In one specific example, the base station can select different antenna elements from different antenna panels based on thermal conditions, such as the use of co-located dual-polarized antenna array(s) when thermal conditions are acceptable, but to instead use one or more non-co-located dual-polarized antenna array(s) when thermal conditions exceed a threshold, so as to mitigate the thermal overhead of the co-located dual-polarized antenna array(s). In another specific example, the base station can select different antenna elements from different antenna panels based on rate or diversity requirements, so as to use the co-located dual-polarized antenna array(s) to achieve better polarization MIMO gains, but to instead use one or more antenna elements from the non-co-located dual-polarized antenna array(s) to achieve better diversity/spatial MIMO gains. In some examples, the base station can perform antenna selection in this regard for each of multiple UEs in a time-dependent manner. In addition, in some examples, the base station can perform antenna selection in this regard based on feedback from one or more UEs.

Accordingly, in aspects described herein, the base station can perform the antenna selection to provide desired gains at each of multiple UEs, to protect from thermal concerns at the base station, and/or the like. This can allow for balancing antenna gains with appropriate thermal conditions to provide efficient communication operations at the base station and also can protect the antennas from overheating, damage or inefficiencies resulting from excessive heat.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and parameter reporting component 242 for reporting one or more parameters related to antenna selection at another device, such as a base station 102, in accordance with aspects described herein. In addition, some nodes may have a modem 340 and communicating component 342 for performing antenna selection, in accordance with aspects described herein. Though a UE 104 is shown as having the modem 240 and parameter reporting component 242 and a base station 102/gNB 180 is shown as having the modem 340 and communicating component 342, this is one illustrative example, and substantially any node or type of node may include a modem 240 and parameter reporting component 242 and/or a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 342 can perform antenna selection to select among antenna elements from one or more antenna panels in communicating with a UE 104. For example, communicating component 342 can select among antenna elements of an antenna panel of co-located dual-polarized antenna elements, antenna elements of an antenna panel of non-co-located dual-polarized antenna elements, etc. In another example, communicating component 342 can select among correlated or uncorrelated (or weakly correlated) antenna elements of a set of co-located dual-polarized antenna elements. In an example, the selection of antenna elements can be based on thermal considerations, rate or diversity parameters, etc. In one example, a parameter reporting component 242 can report rate or diversity requirements to the base station 102, and communicating component 342 can select antenna elements based on the reported rate or diversity requirements.

Figure 2:
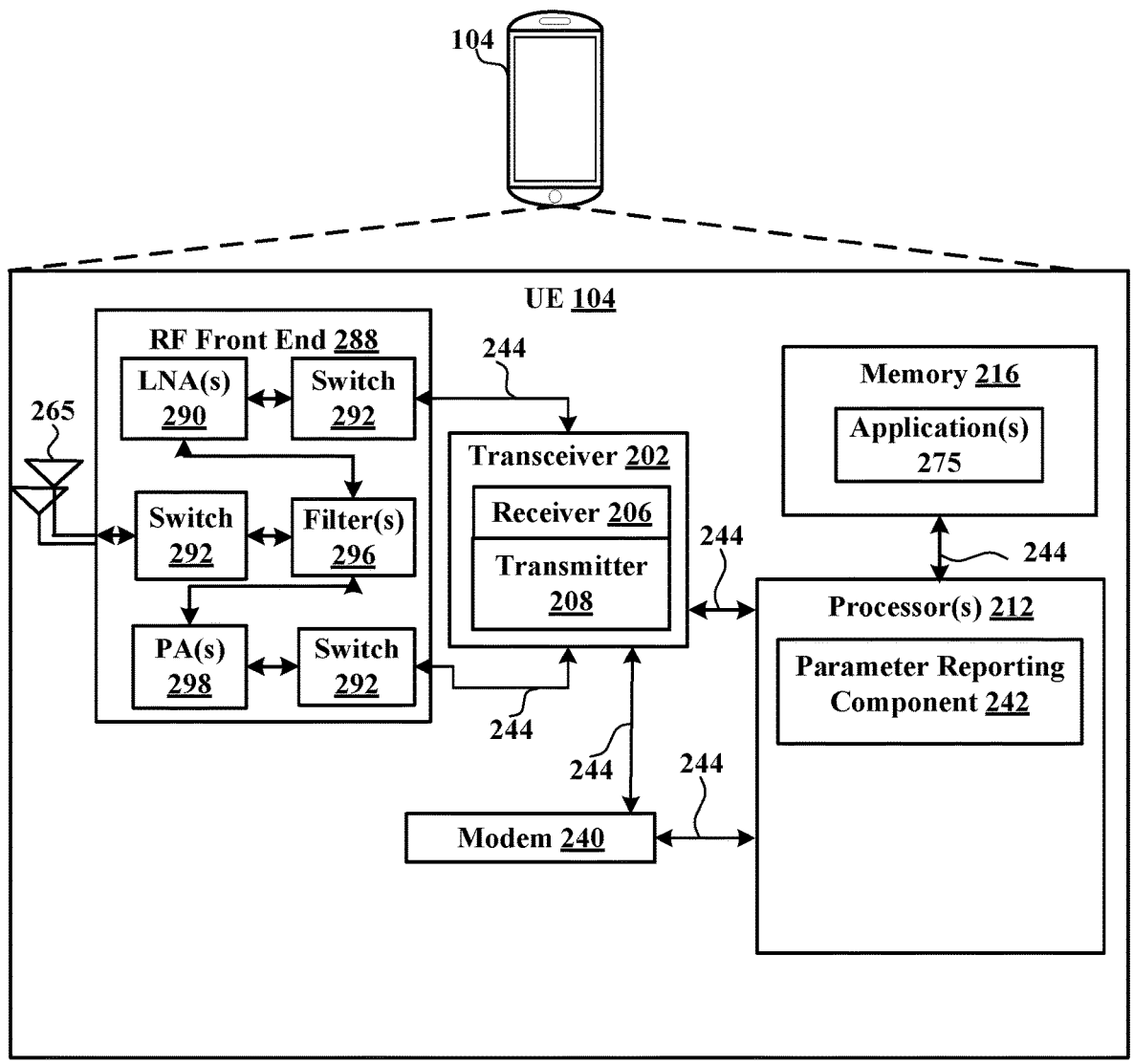
FIG. 2 is a block diagram illustrating an example of a UE, in accordance with various aspects of the present disclosure.
Figure 3:
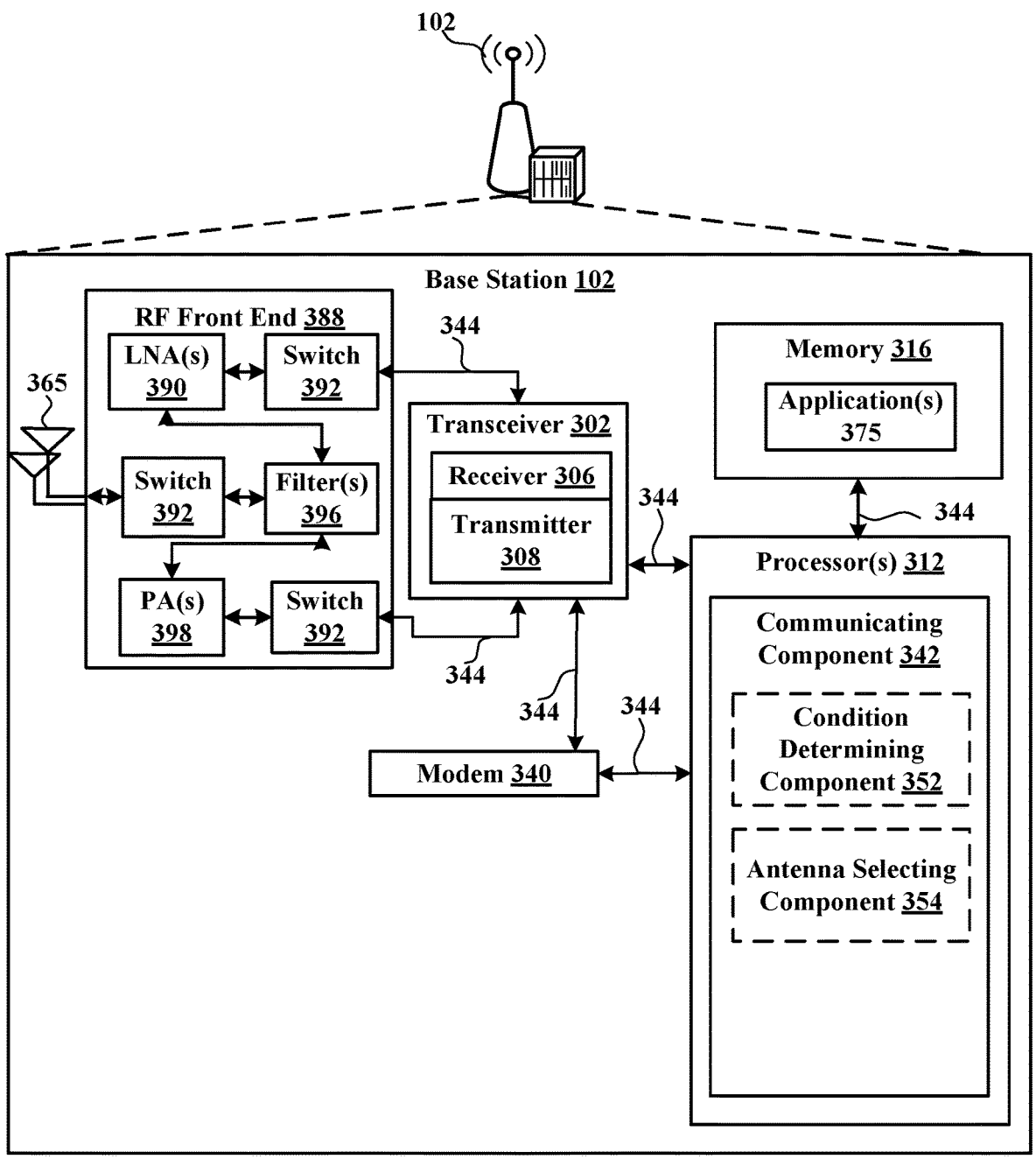
FIG. 3 is a block diagram illustrating an example of a base station, in accordance with various aspects of the present disclosure.
Figure 4:
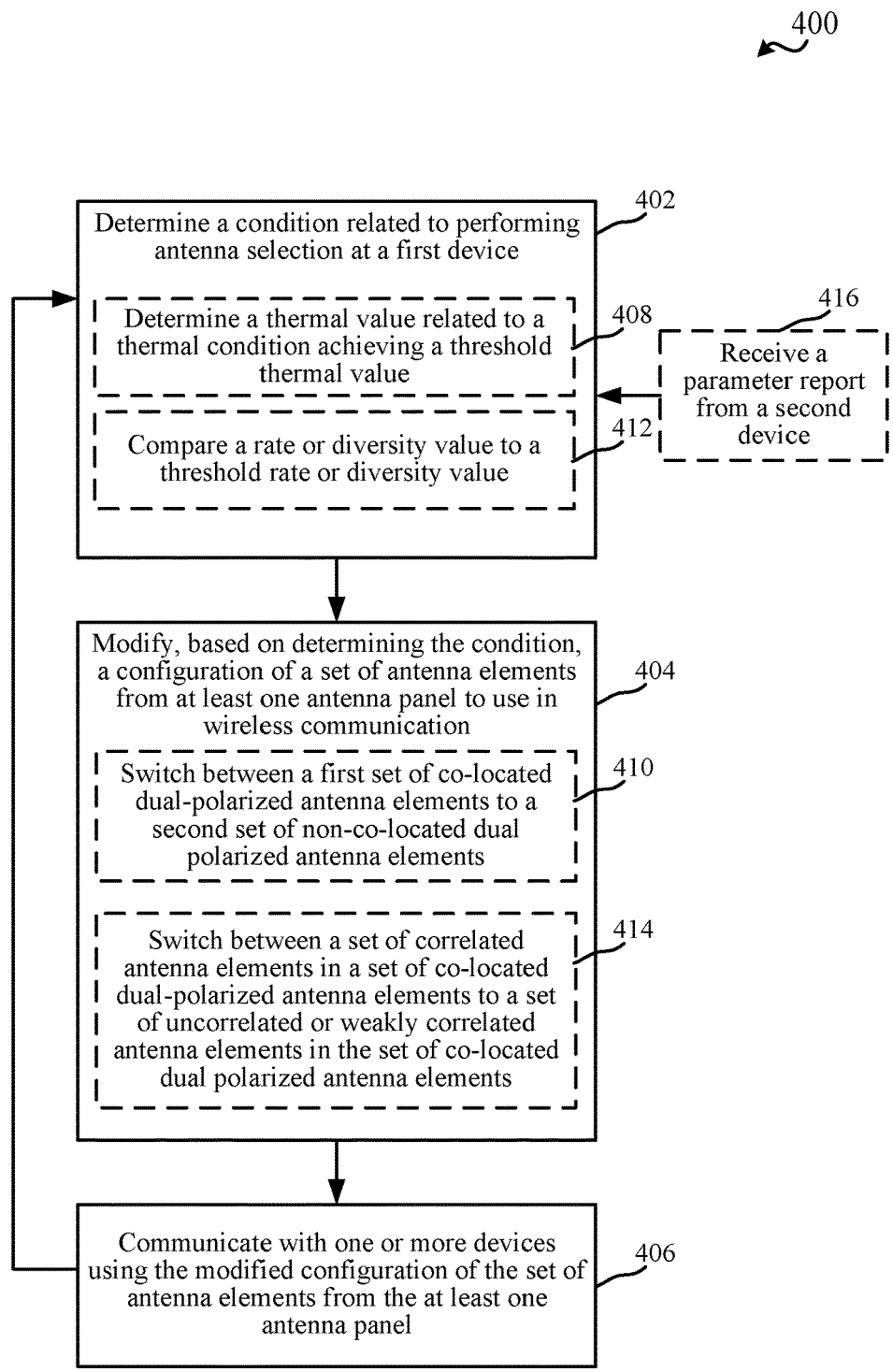
FIG. 4 is a flow chart illustrating an example of a method for performing antenna selection to select antennas to use in communicating with one or more devices, in accordance with various aspects of the present disclosure.
Figure 7:
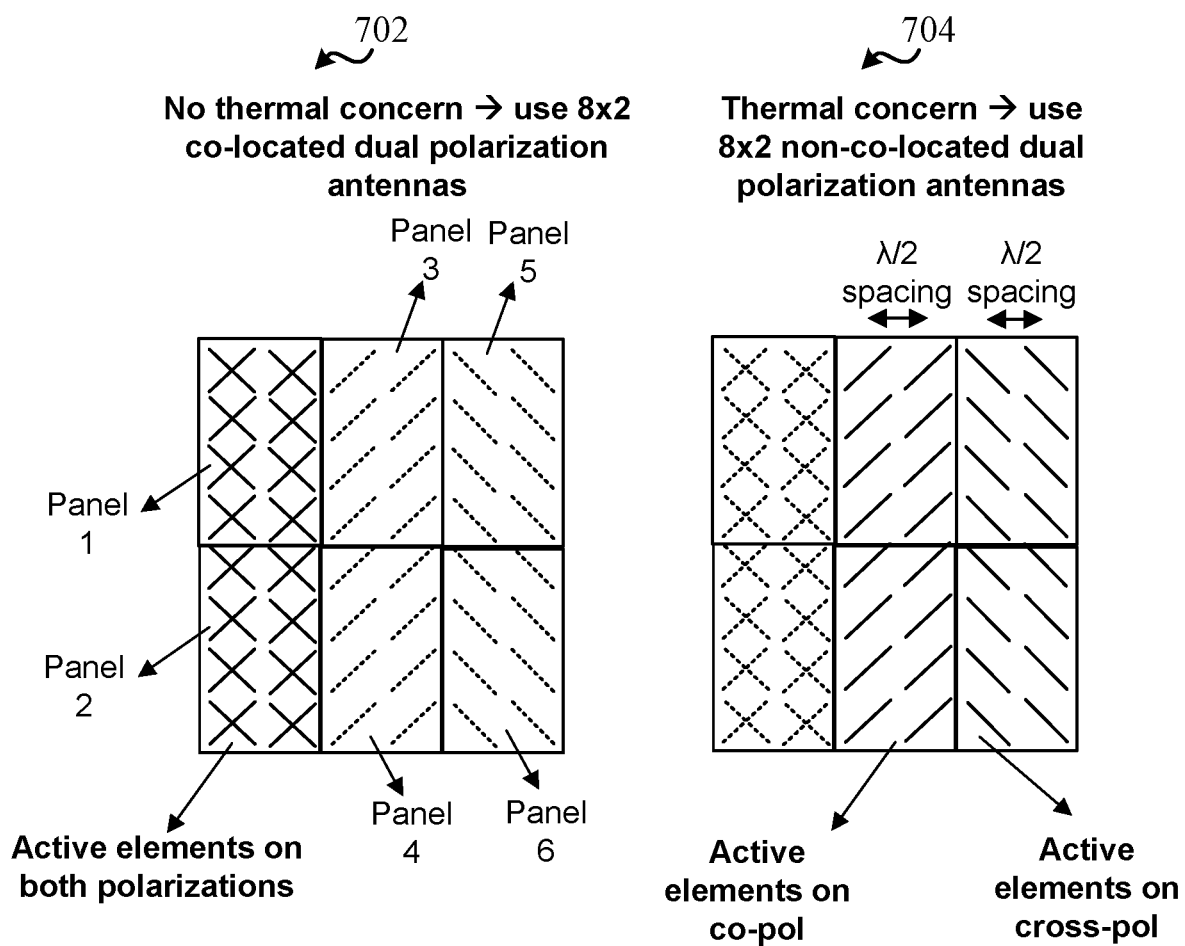
FIG. 7 illustrates examples of co-located dual-polarized antenna configurations and non-co-located dual-polarized antenna configurations, in accordance with aspects described herein.
Figure 8:
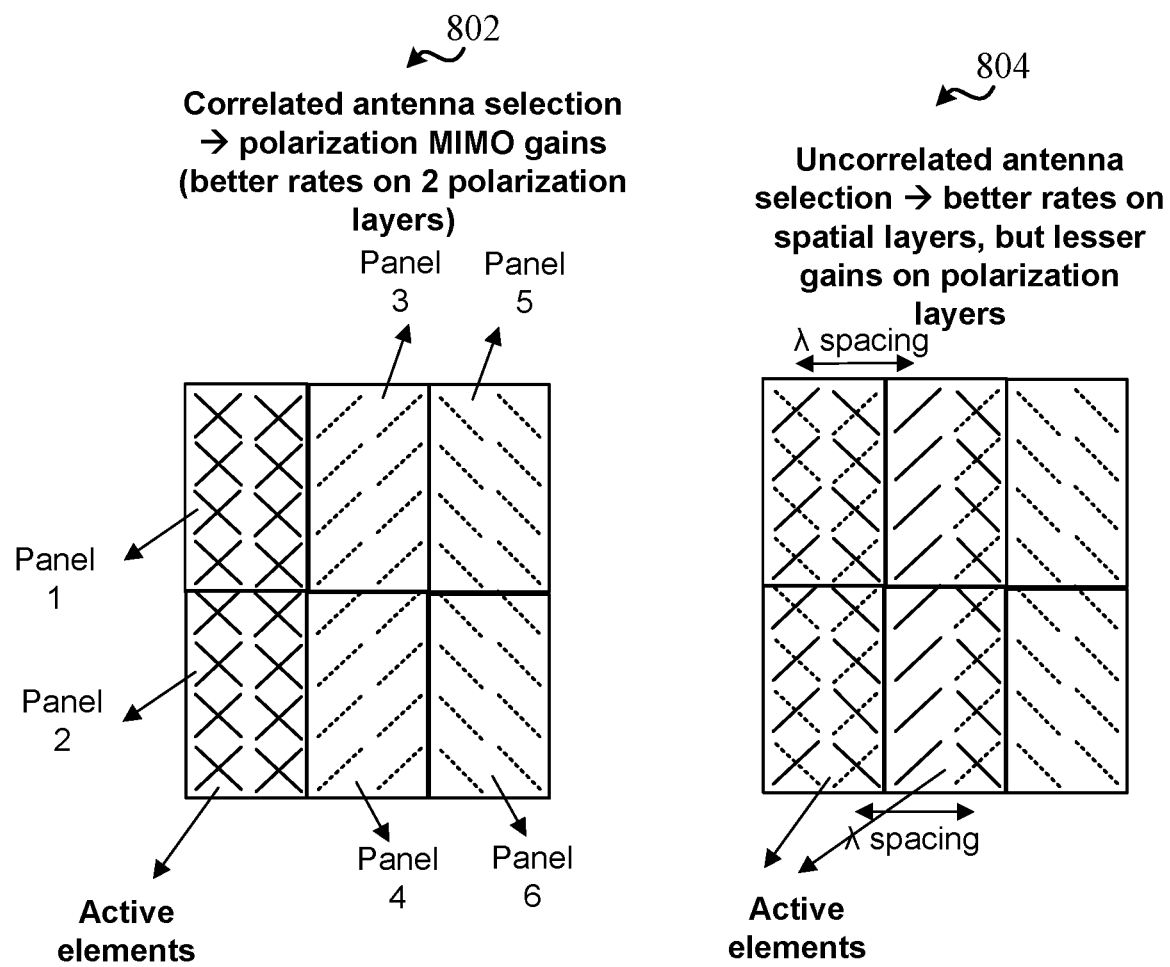
FIG. 8 illustrates examples of co-located dual-polarized antenna configurations, using correlated and uncorrelated or weakly correlated antenna elements, and non-co-located dual-polarized antenna configurations, in accordance with aspects described herein.
Figure 9:
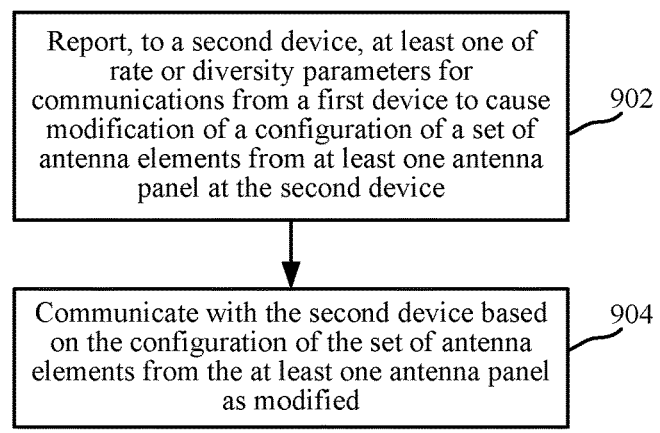
FIG. 9 illustrates a flow chart of an example of a method for reporting parameters for performing antenna selection, in accordance with aspects described herein.

Turning now to FIGS. 2-10, aspects are depicted with reference to one or more components and one or more methods that may perform the actions or operations described herein, where aspects in dashed line may be optional. Although the operations described below in FIGS. 4 and 9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or parameter reporting component 242 for reporting parameters related to antenna selection, in accordance with aspects described herein.

In an aspect, the one or more processors 212 can include a modem 240 and/or can be part of the modem 240 that uses one or more modem processors. Thus, the various functions related to parameter reporting component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with parameter reporting component 242 may be performed by transceiver 202.

Also, memory 216 may be configured to store data used herein and/or local versions of applications 275 or parameter reporting component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining parameter reporting component 242 and/or one or more of its subcomponents, and/or data associated therewith, when UE 104 is operating at least one processor 212 to execute parameter reporting component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIG. 10. Similarly, the memory 216 may correspond to the memory described in connection with the UE in FIG. 10.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and communicating component 342 for performing antenna selection, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, communicating component 342 can optionally include a condition determining component 352 for determining one or more conditions for performing antenna selection, and/or an antenna selecting component 354 for selecting among multiple antenna elements or panels of elements to use in communicating with one or more other devices, which can be based on determining the one or more conditions, in accordance with aspects described herein.

In an aspect, the processor(s) 312 may correspond to one or more of the processors described in connection with the base station in FIG. 10. Similarly, the memory 316 may correspond to the memory described in connection with the base station in FIG. 10.

FIG. 4 illustrates a flow chart of an example of a method 400 for performing antenna selection to select antennas to use in communicating with one or more devices, in accordance with aspects described herein. In an example, a base station 102 can perform the functions described in method 400 using one or more of the components described in FIGS. 1 and 3. In some examples, a UE 104 or any other device capable of wireless communications and having multiple antenna elements can perform the functions described in method 400 using one or more of the components described in FIGS. 1 and 3.

In method 400, at Block 402, a condition related to performing antenna selection at a first device can be determined. In an aspect, condition determining component 352, e.g., in conjunction with processor(s) 312, memory 316, transceiver 302, communicating component 342, etc., can determine the condition related to performing antenna selection at the first device. For example, the first device can be the base station 102, and performing antenna selection can include performing selection of one or more antenna elements of one or more antenna panels, which can be included in antennas 365. The determined condition can lead to determining which antenna elements or panels to activate, in accordance with various aspects described herein. In an example, the antenna elements or panels to activate may depend on one or more other devices (e.g., UEs) scheduled by the first device (e.g., a base station 102). Various examples of antenna elements and corresponding panels or arrays are shown and described in FIGS. 5-6.

Figure 5:
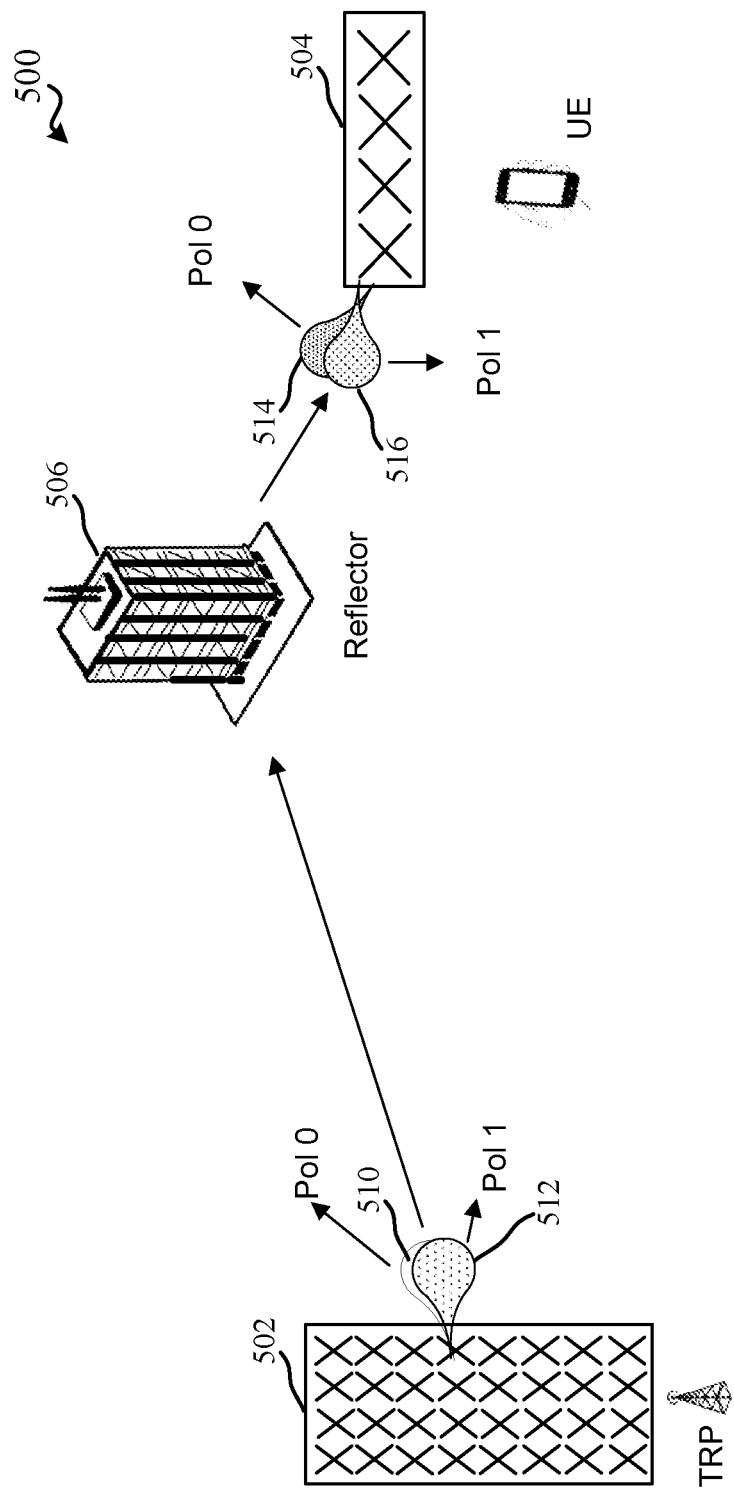
FIG. 5 illustrates an example of a system for performing wireless communications using a co-located dual-polarized antenna array, in accordance with aspects described herein.

FIG. 5 illustrates an example of a system 500 for performing wireless communications using a co-located dual-polarized antenna array. System 500 can include a dual-polarized antenna array 502 at a transmission/reception point (TRP), where a TRP can be a base station 102 or a TRP operated by a base station 102, etc. System 500 can also include a dual-polarized antenna array 504 at a UE, and/or a reflector 506 that reflects signals from dual-polarized antenna array 502 to dual-polarized antenna array 504. The reflector 506 can include a stationary object, such as a glass or a metallic object in a building or other structures, such as building corners, trees, etc., a mobile object, such as an automobile, vehicles, etc., that exists in space and reflects signals from the dual-polarized antenna array 502 to the dual-polarized antenna array 504.

Dual-polarized antenna array 502 can be a co-located dual-polarized antenna array of (for example) 32 dual-polarized antenna elements (in an eight-by-four configuration) that are co-located on a single antenna panel. A TRP can include one or more such panels. A UE can also include one or more such panels. Each dual-polarized antenna element in antenna array 502 can include two polarizations, represented by each line of each 'X,' which can each be used to transmit signals at orthogonal polarizations. As shown in FIG. 5, dual-polarized antenna array 502 can transmit a signal from a single antenna element on polarization 0 510 (often called as the co-polarization component) and polarization 1 512 (often called as the cross-polarization component), which can include transmitting the signals along a same direction of interest using both polarizations of the dual-polarized antenna element. Dual-polarized antenna array 504 of the UE can similarly receive the signals along the same direction of interest at a single antenna element on polarization 0 514 and polarization 1 516. Using such antenna configurations of co-located dual-polarized antenna elements can allow for achieving polarization MIMO gains.

Figure 6:
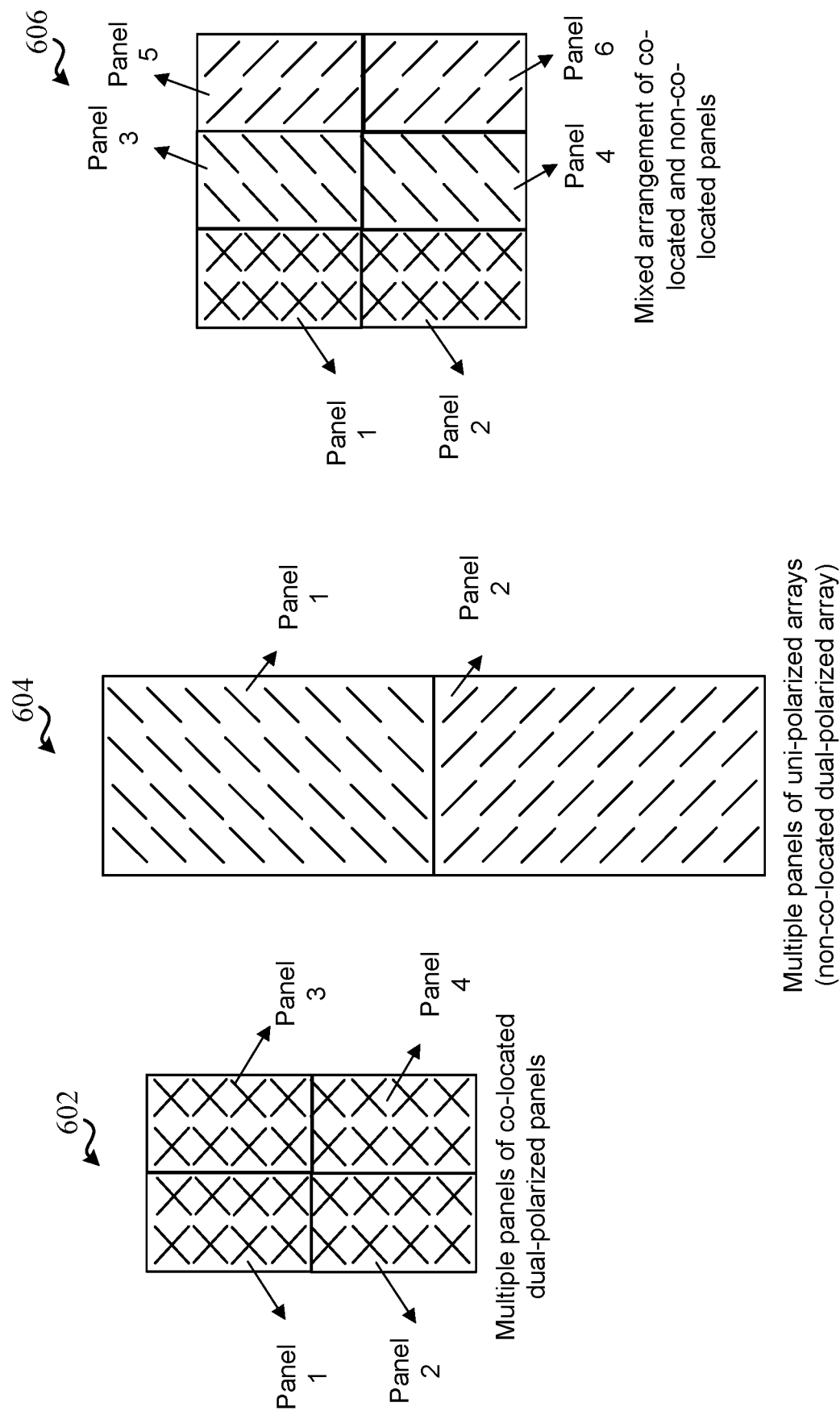
FIG. 6 illustrates various examples of antenna array configurations that can be used at a TRP or UE or other device, in accordance with aspects described herein.

FIG. 6 illustrates various examples of antenna array configurations that can be used at a TRP or UE or other device. Antenna array configuration 602 includes multiple panels of co-located dual-polarized arrays (or panels). Antenna array configuration 604 is another example having multiple (two, in this example) uni-polarized antenna arrays, which collectively can be referred to as a "non-co-located dual-polarized" antenna array. For example, each panel in antenna array configuration 604 can have a first array of single polarization antennas at a first polarization and a second array of single polarization antennas at a second polarization. Each antenna array configuration 402, 404 can have various advantages or disadvantages, as described above. Accordingly, in some examples, an antenna array configuration at a TRP or UE or other device may use both co-located and non-co-located dual polarization antenna arrays. An example is shown at antenna array configuration 606, which can include multiple panels, including co-located dual-polarized antenna array panels 1 and 2 and non-co-located dual-polarized antenna array panels 3-6.

A large array at a base station (or gNB) that supports 5G NR can be constructed with multiple panels, where each panel is a small array. The small array itself can be co-located dual-polarized or uni-polarized/non-co-located dual polarized, as described above and in examples shown in FIG. 6. In some examples, aspects described herein can be similarly applied to panels having more than two polarized antenna elements, whether co-located or non-co-located.

In method 400, at Block 404, based on determining the condition, a configuration of a set of antenna elements from at least one antenna panel to use in wireless communication can be modified. In an aspect, antenna selecting component 354, e.g., in conjunction with processor(s) 312, memory 316, transceiver 302, communicating component 342, etc., can modify, based on determining the condition, the configuration of the set of antenna elements from at least one antenna panel to use in wireless communication. As described, for example, the base station 102 can be equipped with multiple antenna panels, which may include one or more panels of co-located dual-polarized antennas, one or more panels of non-co-located dual-polarized antennas, etc., which may include a configuration such as that shown at antenna array configuration 606 in FIG. 6, or substantially any combination of antenna panels. In any case, for example, antenna selecting component 354 can determine to select certain antenna elements or antenna panels to use in communicating with another device based on the determined condition, which may include selecting one type of antenna element or corresponding panel over another type, selecting certain antenna elements of a given panel or one or more panels based on detecting the condition, etc. For instance, the set of antenna elements from at least one panel can have a performance difference with respect to other antenna elements of the same panel or different panels, and antenna selecting component 354 can select antenna elements to achieve the performance differences, as described further herein.

In method 400, at Block 406, one or more devices can be communicated with using the modified configuration of the set of antenna elements from the at least one antenna panel. In an aspect, communicating component 342, e.g., in conjunction with processor(s) 312, memory 316, transceiver 302, etc., can communicate with one or more devices using the modified configuration of the set of antenna elements from the at least one antenna panel. For example, based on determining which antenna elements are selected by the antenna selecting component 354, communicating component 342 can activate the antenna elements of at least one antenna panel to transmit communications to, or receive communications from, the one or more devices. In an example, where the base station 102 or TRP includes the antenna elements, the base station 102 or TRP can activate the antenna elements to transmit downlink communications to, or receiving uplink communications from, one or more UEs. Moreover, in an example, a base station 102 can include multiple TRPs, which may each have one or more antenna panels of various configurations of antenna elements, and the base station 102 can activate antenna elements for each TRP based on determined conditions at the given TRP or at the base station 102, etc.

In an example, in determining the condition at Block 402, optionally at Block 408, a thermal value related to a thermal condition can be determined as achieving a threshold thermal value. In an aspect, condition determining component 352, e.g., in conjunction with processor(s) 312, memory 316, transceiver 302, communicating component 342, etc., can determine the thermal value related to the thermal condition achieving the threshold value. For example, condition determining component 352 can obtain or monitor thermal parameters from a physical thermal measuring component or from a device at or near base station 102 or the corresponding antenna panels. The thermal value may indicate a temperature at or near the base station 102 or the corresponding antenna panels. In an example, condition determining component 352 can periodically monitor the thermal value, receive a notification that the thermal value achieves the threshold parameter value, receive a notification to switch the antenna elements based on a thermal condition, etc. Thus, determining of the condition can be based on periodic monitoring, event triggering (e.g., receiving value or trigger notifications), and/or the like. In any case, based on condition determining component 352 determining that the thermal value exceeds the threshold thermal value (e.g., temperature over a threshold temperature), antenna selecting component 354 can select the antennas to use in communicating with the one or more devices.

Accordingly, in one example, in modifying the configuration the set of antenna elements at Block 404, optionally at Block 410, a first set of co-located dual-polarized antenna elements and a second set of non-co-located dual-polarized antenna elements can be switched between. In an aspect, antenna selecting component 354, e.g., in conjunction with processor(s) 312, memory 316, transceiver 302, communicating component 342, etc., can switch between the first set of co-located dual-polarized antenna elements and the second set of non-co-located dual-polarized antenna elements. For example, as co-located dual-polarized antenna arrays can be more susceptible to failure or inefficiencies due to thermal considerations, antenna selecting component 354 can switch to use at least some non-co-located dual polarized antenna elements where a certain thermal condition is detected. In an example, switching between the sets of antenna elements can include deactivating one or more co-located dual-polarized antenna elements or panels of antenna elements and instead activating one or more non-co-located dual-polarized antenna elements or panels of such antenna elements. In addition, for example, antenna selecting component 354 can switch from using a first set of co-located dual-polarized antenna elements to a second set of non-co-located dual-polarized antenna elements (e.g., where a thermal condition is detected) and/or from using the second set of non-co-located dual-polarized antenna elements to the first set of co-located dual-polarized antenna elements. An example is shown in FIG. 7.

FIG. 7 illustrates examples of co-located dual-polarized antenna configurations and non-co-located dual-polarized antenna configurations. Antenna array configurations 702 and 704 can include antenna panels similar to antenna array 606 in FIG. 6. In antenna array configurations 702 and 704 dotted lines can indicate deactivated antenna elements or pols, and solid lines can indicate activated antenna elements or pols. In antenna array configuration 702, panels 1 and 2, which are co-located dual-polarized antenna panels (e.g., forming an eight-by-two co-located dual-polarized antenna array), can be activated where there is no thermal concern (e.g., where the thermal value does not achieve the thermal parameter threshold). In addition, in antenna array configuration 702, panels 3-6 of non-co-located dual-polarized antennas (e.g., effectively forming an eight-by-two non-co-located dual-polarized antenna array) may not be activated where there is no thermal concern. In antenna array configuration 704, panels 3-6 of non-co-located dual-polarized antennas can be activated where there is a thermal concern, and panels 1 and 2 of co-located dual-polarized antennas can be deactivated. In an example, antenna selecting component 354 can switch between these configurations of active antenna panels based on whether the thermal condition is detected or not.

In this example, the base station 102 (e.g., gNB) selects different antenna elements from different panels based on thermal conditions. For instance, as a non-co-located design can better address a higher thermal overhead, antenna selecting component 352 can select a design of non-co-located antenna elements (e.g., antenna array configuration 704) under such conditions. If thermal conditions exceed a threshold, gNB can switch from antenna array configuration 702, or a similar design of co-located antenna elements, to antenna array configuration 704. This can be an improved solution to simply turning OFF antenna elements, which can lead to loss in performance (such as reduced array gain).

In another example, in determining the condition at Block 402, optionally at Block 412, a rate or diversity value can be compared to a threshold rate or diversity value. In an aspect, condition determining component 352, e.g., in conjunction with processor(s) 312, memory 316, transceiver 302, communicating component 342, etc., can compare the rate or diversity value to the threshold rate or diversity value. For example, condition determining component 352 can compare rate or diversity requirements of a UE 104 to determine an antenna panel configuration to use in communicating with the UE 104. For example, the antenna elements for each type of antenna array may have different inter-antenna element spacings, which can provide different gains, such as polarization MIMO gains or increased diversity or spatial gains. In an example, condition determining component 352 can periodically monitor the rate or diversity requirements of the UE 104, which can include receiving a report of such parameters or related values from the UE 104, determining channel condition parameters at the base station 102, comparing the parameters to one or more threshold parameter values (e.g., based on receiving the parameters or determining the parameters), etc. Thus, determining of the condition can be based on periodic monitoring, event triggering (e.g., receiving value or trigger notifications), and/or the like.

For example, condition determining component 352 can determine rate requirements based on a rate requirement configured for the UE 104 or a channel thereof (e.g., specified in an amount of data over a period of time, such as bits per second, or an enumeration representative of the amount of data over the period of time). For example, condition determining component 352 can determine diversity requirements based on a transmission rank selected for the UE 104 (e.g., rank-one, using multiple antennas to generate the same signal, may be a low diversity requirement and may prefer correlated antenna elements). In any case, based on received or determined rate or diversity requirements or related parameters related to a UE 104, different configurations of antenna elements within one or more panels may provide more desirable gains for the UE 104.

Accordingly, in one example, in modifying the configuration the set of antenna elements at Block 404, optionally at Block 414, a set of correlated antenna elements in a set of co-located dual-polarized antenna elements and a set of uncorrelated or weakly correlated antenna elements in a set of co-located dual-polarized antenna elements can be switched between. In an aspect, antenna selecting component 354, e.g., in conjunction with processor(s) 312, memory 316, transceiver 302, communicating component 342, etc., can switch between the set of correlated antenna elements in the set of co-located dual-polarized antenna elements and the set of uncorrelated or weakly correlated antenna elements in the set of co-located dual-polarized antenna elements. For example, uncorrelated or weakly correlated antenna elements can be defined by a physical spacing, on an antenna array, of a threshold inter-antenna element separation distance.

For example, as uncorrelated or weakly correlated antenna elements can lead to increased diversity or spatial MIMO gains, antenna selecting component 354 can switch to use at least some uncorrelated or weakly correlated antenna elements based on certain channel conditions with the UE 104, which may indicate lower rate or higher diversity requirements at the UE 104. In an example, switching between the correlated and uncorrelated or weakly correlated antenna elements can include deactivating one or more polarizations of a co-located antenna elements or activating an antenna element of a uni-polarized antenna panels instead activating both polarizations of a co-located dual-polarized antenna elements or panels of such elements, or vice versa. In addition, for example, antenna selecting component 354 can switch from using a set of correlated antenna elements in a set of co-located dual-polarized antenna elements to a set of uncorrelated or weakly correlated antenna elements in the set of co-located dual-polarized antenna elements and/or from using the set of uncorrelated or weakly correlated antenna elements in the set of co-located dual-polarized antenna elements to the set of correlated antenna elements in the set of co-located dual-polarized antenna elements. An example is shown in FIG. 8.

FIG. 8 illustrates examples of co-located dual-polarized antenna configurations, using correlated and uncorrelated or weakly correlated antenna elements, and non-co-located dual-polarized antenna configurations. Antenna array configurations 802 and 804 can include antenna panels similar to antenna array configuration 606 in FIG. 6. In antenna array configurations 802 and 804 dotted lines can indicate deactivated antenna elements or polarizations, and solid lines can indicate activated antenna elements or polarizations. In antenna array configuration 802, panels 1 and 2, which are co-located dual-polarized antenna panels (e.g., forming an eight-by-two co-located dual-polarized antenna array), can be activated to achieve polarization MIMO gains (e.g., where the UE 104 is determined to have high rate requirements—e.g., rate requirements that achieve a threshold rate—or low diversity requirements—e.g., diversity requirements that do not achieve a threshold diversity). In addition, in antenna array configuration 802, panels 3-6 of non-co-located dual-polarized antennas (e.g., effectively forming an eight-by-two non-co-located dual-polarized antenna array) may not be activated. In antenna array configuration 704, one polarization of each antenna element in panels 1 and 2 can be activated to achieve a set of uncorrelated or weakly correlated antenna element panels and the co-located dual-polarized antenna panel, and panels 3 and 4 of non-co-located dual-polarized antennas can be activated to achieve diversity/spatial MIMO gains. In an example, antenna selecting component 354 can switch between these configurations of active antenna elements or corresponding panels based on whether polarization MIMO gains or spatial/diversity MIMO gains are preferred for a UE 104.

In an example, antenna elements that are spaced λ/2 apart, as in a co-located dual-polarized antenna panel, are correlated and lead to good polarization MIMO gains. Antenna elements that are spaced λ apart, as in adjacent non-co-located dual-polarized antenna panels, can lead to grating lobes, lesser polarization MIMO gains (as the polarization elements do not always experience the channel in exactly the same way), but better uncorrelation properties and hence increased diversity/spatial MIMO gains, etc. Choice to switch between the antenna array configuration 802 and antenna array configuration 804 may be based on UE's reporting of angular spread, gNB's sense of channel conditions based on UE's prior beam management and RSRP reports, etc.

In this regard, for example, in method 400, optionally at Block 416, a parameter report can be received from a second device. In an aspect, condition determining component 352, e.g., in conjunction with processor(s) 312, memory 316, transceiver 302, communicating component 342, etc., can receive the parameter report from the second device. For example, the parameter report can be received from and/or for a UE 104 communicating with base station 102. The parameter report can indicate parameters related to determining rate or diversity requirements at the UE 104, such as an angular spread corresponding to a dominant cluster in a channel between the base station 102 and the UE 104, path loss, and/or the like. Condition determining component 352 can accordingly determine a condition for switching antenna elements based on the reported parameters, based on determining channel conditions from the reported parameters, and/or the like. For example, condition determining component 352 may determine a channel condition with the UE 104 based on the reported path loss or based on measuring such parameters (e.g., the condition determining component 352 can measure path loss to the UE 104). In any case, where a condition related to rate or diversity requirements of the UE 104 is detected, antenna selecting component 354 can switch between antenna configurations, as described above.

In addition, for example, method 400 can proceed from Block 406 to Block 402 to continually attempt to determine conditions for antenna switching for one or more devices. In this regard, as a device (e.g., UE) moves across locations with respect to the first device (e.g., with respect to base station 102), and channel conditions may change, antenna selecting component 354 may continue to switch among antenna array configurations to accommodate the device (e.g., UE) at each location.

FIG. 9 illustrates a flow chart of an example of a method 900 for reporting parameters for performing antenna selection, in accordance with aspects described herein. In an example, a UE 104 can perform the functions described in method 900 using one or more of the components described in FIGS. 1-2. In some examples, any other device capable of wireless communications with a device that supports multiple antenna elements can perform the functions described in method 900 using one or more of the components described in FIGS. 1-2.

In method 900, at Block 902, at least one of rate or diversity parameters for communications from a first device can be reported, to a second device, to cause modification of a configuration of a set of antenna elements from at least one antenna panel at the second device. In an aspect, parameter reporting component 242, e.g., in conjunction with processor(s) 212, memory 216, transceiver 202, etc., can report, to the second device (e.g., base station 102), at least one of rate or diversity parameters for communications from the first device (e.g., UE 104) to cause modification of a configuration of the set of antenna elements from at least one antenna panel at the second device. For example, as described, the at least one of rate or diversity parameters can include explicit rate or diversity parameters (e.g., throughput requirements, transmission rank, etc.) or parameters from which rate or diversity parameters can be determined (e.g., angular spread corresponding to a dominant cluster in a channel between the first and the second device). For example, parameter reporting component 242 can report the parameters in radio resource control (RRC) signaling, uplink control signaling from UE 104 to base station 102, and/or the like. As described, the second device can modify antenna selection based on at least the rate or diversity parameters, in one example.

In method 900, at Block 904, the second device can be communicated with based on the configuration of the set of antenna elements from at least one antenna panel as modified. In an aspect, the UE 104, e.g., in conjunction with processor(s) 212, memory 216, transceiver 202, etc., can communicate with the second device (e.g., base station 102) based on the configuration of the set of antenna elements from the at least one antenna panel as modified. For example, this can include receiving communications from, or transmitting communications to, the second device, where the second device uses the configuration of antenna elements determined based on the reported rate or diversity (or other) parameters.

Figure 10:
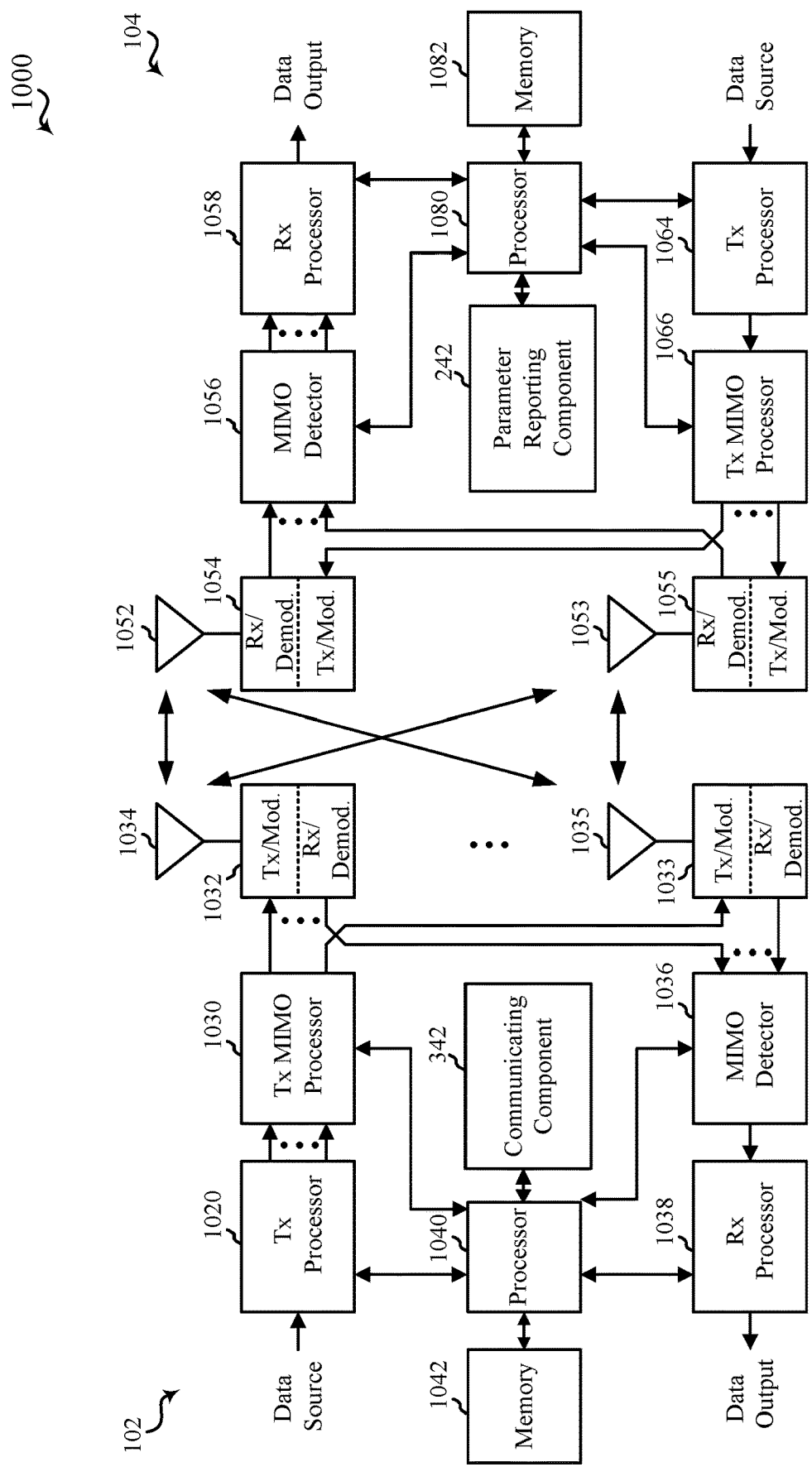
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a parameter reporting component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1000.

The following aspects are illustrative only and aspects thereof may be combined with aspects of other embodiments or teaching described herein, without limitation.

Aspect 1 is a method for wireless communication at a first device including determining a condition related to at least one of a thermal condition at the first device or receiving, at the first device, rate or diversity parameters reported to the first device by a second device, modifying, based on determining the condition, a configuration of a set of antenna elements from at least one antenna panel to use in wireless communication, and communicating with one or more devices using the modified configuration of the set of antenna elements from the at least one antenna panel.

In Aspect 2, the method of Aspect 1 includes wherein modifying the configuration of the set of antenna elements from the at least one antenna panel includes switching from a first set of co-located dual-polarized antenna elements to a second set of non-co-located dual-polarized antenna elements.

In Aspect 3, the method of Aspect 2 includes wherein determining the condition includes determining that a thermal value related to the thermal condition achieves a threshold thermal value.

In Aspect 4, the method of any of Aspects 2 or 3 includes modifying, based on determining that the thermal value no longer achieves the threshold thermal value, the configuration of the set of antenna elements from the at least one antenna panel to switch from the second set of non-co-located dual-polarized antenna elements to the first set of co-located dual-polarized antenna elements.

In Aspect 5, the method of any of Aspects 1 to 4 includes wherein modifying the configuration of the set of antenna elements from the at least one antenna panel includes switching from a set of correlated antenna elements in a set of co-located dual-polarized antenna elements to a set of uncorrelated or weakly correlated antenna elements in the set of co-located dual-polarized antenna elements.

In Aspect 6, the method of Aspect 5 includes wherein the set of uncorrelated or weakly correlated antenna elements are physically spaced apart by a threshold inter-antenna element separation distance.

In Aspect 7, the method of any of Aspects 1 to 4 includes wherein modifying the configuration of the set of antenna elements from the at least one antenna panel includes switching from a set of uncorrelated or weakly correlated antenna elements in a set of co-located dual-polarized antenna elements to a set of correlated antenna elements in the set of co-located dual-polarized antenna elements.

In Aspect 8, the method of any of Aspects 1 to 7 includes wherein the rate or diversity parameters include an indication, from the second device, of an angular spread corresponding to a dominant cluster in a channel between the first and the second device.

In Aspect 9, the method of any of Aspects 1 to 8 includes wherein the rate or diversity parameters include channel conditions reported by the second device or sensed by the first device.

In Aspect 10, the method of any of Aspects 1 to 9 includes wherein modifying the configuration of the set of antenna elements from the at least one antenna panel is further based on one or more parameters of the one or more devices that are scheduled for communications by the first device.

In Aspect 11, the method of Aspect 10 includes wherein the one or more parameters include a location of the one or more devices, and wherein modifying the configuration of the set of antenna elements from the at least one antenna panel is based on performance difference between a first set of co-located dual-polarized antenna elements and a second set of non-co-located dual-polarized antenna elements.

In Aspect 12, the method of any of Aspects 1 to 11 includes modifying the configuration of the set of antenna elements from the at least one antenna panel to include a different set of antenna elements where the one or more devices move location with respect to the first device.

Aspect 13 is a method for wireless communication at a first device including reporting, to a second device, at least one of rate or diversity parameters for communications from the first device to cause modification of a configuration of a set of antenna elements from at least one antenna panel at the second device, and communicating with the second device based on the configuration of the set of antenna elements from the at least one antenna panel as modified.

In Aspect 14, the method of Aspect 13 includes wherein the rate or diversity parameters include an angular spread corresponding to a dominant cluster in a channel between the first and the second device.

In Aspect 15, the method of any of Aspects 13 or 14 includes wherein the rate or diversity parameters include channel conditions determined for communications from the second device.

Aspect 16 is an apparatus for wireless communication including a set of antenna elements across multiple antenna panels including one or more sets of co-located dual-polarized antenna elements and one or more sets of non-co-located dual-polarized antenna elements, a transceiver coupled to the set of antenna elements, a memory configured to store instructions, and one or more processors communicatively coupled with the memory and the transceiver. The one or more processors are configured to determine a condition related to at least one of a thermal condition at the apparatus, rate or diversity parameters reported to the apparatus by a device, modify, based on determining the condition, a configuration of the set of antenna elements from at least one antenna panel of the multiple antenna panels to use in wireless communication, and communicate with one or more devices using the modified configuration of the set of antenna elements from the at least one antenna panel.

In Aspect 17, the apparatus of Aspect 16 includes wherein the one or more processors are configured to modify the configuration of the set of antenna elements from the at least one antenna panel at least in part by switching from a first set of co-located dual-polarized antenna elements to a second set of non-co-located dual-polarized antenna elements.

In Aspect 18, the apparatus of Aspect 17 includes wherein the one or more processors are configured to determine the condition at least in part by determining that a thermal value related to the thermal condition achieves a threshold thermal value.

In Aspect 19, the apparatus of any of Aspects 17 or 18 includes wherein the one or more processors are further configured to modify, based on determining that the thermal value no longer achieves the threshold thermal value, the configuration of the set of antenna elements from the at least one antenna panel to switch from the second set of non-co-located dual-polarized antenna elements to the first set of co-located dual-polarized antenna elements.

In Aspect 20, the apparatus of any of Aspects 16 to 19 includes wherein the one or more processors are configured to modify the configuration of the set of antenna elements from the at least one antenna panel at least in part by switching from a set of correlated antenna elements in a first set of co-located dual-polarized antenna elements to a set of uncorrelated or weakly correlated antenna elements in the first set of co-located dual-polarized antenna elements.

In Aspect 21, the apparatus of Aspect 20 includes wherein the set of uncorrelated or weakly correlated antenna elements are physically spaced apart by a threshold inter-antenna element separation distance.

In Aspect 22, the apparatus of any of Aspects 16 to 19 includes wherein the one or more processors are configured to modify the configuration of the set of antenna elements from the at least one antenna panel at least in part by switching from a set of uncorrelated or weakly correlated antenna elements in a first set of co-located dual-polarized antenna elements to a set of correlated antenna elements in the first set of co-located dual-polarized antenna elements.

In Aspect 23, the apparatus of any of Aspects 16 to 22 includes wherein the rate or diversity parameters include an indication, from the device, of an angular spread corresponding to a dominant cluster in a channel between the apparatus and the device.

In Aspect 24, the apparatus of any of Aspects 16 to 23 includes wherein the rate or diversity parameters include channel conditions reported by the device or sensed by the apparatus.

In Aspect 25, the apparatus of any of Aspects 16 to 24 includes wherein the one or more processors are configured to modify the configuration of the set of antenna elements from the at least one antenna panel further based on one or more parameters of the one or more devices that are scheduled for communications by the apparatus.

In Aspect 26, the apparatus of Aspect 25 includes wherein the one or more parameters include a location of the one or more devices, and wherein the one or more processors are configured to modify the configuration of the set of antenna elements from the at least one antenna panel based on performance difference between a first set of co-located dual-polarized antenna elements and a second set of non-co-located dual-polarized antenna elements.

In Aspect 27, the apparatus of any of Aspects 16 to 26 includes wherein the one or more processors are further configured to modify the configuration of the set of antenna elements from the at least one antenna panel to include a different set of antenna elements where the one or more devices move location with respect to the apparatus.

Aspect 28 is an apparatus for wireless communication including a transceiver, a memory configured to store instructions, and one or more processors communicatively coupled with the memory and the transceiver. The one or more processors are configured to report, to a device, at least one of rate or diversity parameters for communications from the apparatus to cause modification of a configuration of a set of antenna elements from at least one antenna panel at the device, and communicate with the device based on the configuration of the set of antenna elements from the at least one antenna panel as modified.

In Aspect 29, the apparatus of Aspect 28 includes wherein the rate or diversity parameters include an angular spread corresponding to a dominant cluster in a channel between the apparatus and the device.

In Aspect 30, the apparatus of any of Aspects 28 or 29 includes wherein the rate or diversity parameters include channel conditions determined for communications from the device.

Aspect 31 is an apparatus for wireless communication including means for performing the operations of one or more methods in any of Aspects 1 to 15.

Aspect 32 is a computer-readable medium including code executable by one or more processors to perform the operations of one or more methods in any of Aspects 1 to 15.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication at a first device, comprising:
    modifying, based on a condition, a configuration of a set of antenna elements from at least one antenna panel to use in wireless communication, the condition relating to a thermal condition at the first device, wherein modifying the configuration of the set of antenna elements includes switching from a first set of co-located dual-polarized antenna elements to a second set of non-co-located dual-polarized antenna elements; and
    communicating with one or more devices using the modified configuration of the set of antenna elements from the at least one antenna panel.

2. The method of claim 1, further comprising determining the condition based at least in part on determining that a thermal value related to the thermal condition achieves a threshold thermal value.

3. The method of claim 2, further comprising modifying, based on determining that the thermal value no longer achieves the threshold thermal value, the configuration of the set of antenna elements from the at least one antenna panel to switch from the second set of non-co-located dual-polarized antenna elements to the first set of co-located dual-polarized antenna elements.

4. The method of claim 1, wherein modifying the configuration of the set of antenna elements from the at least one antenna panel is further based on one or more parameters of the one or more devices that are scheduled for communications by the first device.

5. The method of claim 4, wherein the one or more parameters include a location of the one or more devices, and wherein modifying the configuration of the set of antenna elements from the at least one antenna panel is based on performance difference between a first set of co-located dual-polarized antenna elements and a second set of non-co-located dual-polarized antenna elements.

6. The method of claim 1, further comprising modifying the configuration of the set of antenna elements from the at least one antenna panel to include a different set of antenna elements where the one or more devices move location with respect to the first device.

7. A method for wireless communication at a first device, comprising:
- modifying, based on a condition, a configuration of a set of antenna elements from at least one antenna panel to use in wireless communication, the condition relating to receiving, at the first device, rate or diversity parameters reported to the first device by a second device, wherein modifying the configuration of the set of antenna elements from the at least one antenna panel includes switching from a first set of antenna elements in a set of co-located dual-polarized antenna elements to a second set of antenna elements in the set of co-located dual-polarized antenna elements, wherein the second set of antenna elements is one of less correlated than or more correlated than the first set of antenna elements; and
- communicating with one or more devices using the modified configuration of the set of antenna elements from the at least one antenna panel.

8. The method of claim 7, wherein the second set of antenna elements are physically spaced apart by a threshold inter-antenna element separation distance.

9. The method of claim 7, wherein the rate or diversity parameters include an indication, from the second device, of an angular spread corresponding to a dominant cluster in a channel between the first device and the second device.

10. The method of claim 7, wherein the rate or diversity parameters include channel conditions reported by the second device or sensed by the first device.

11. The method of claim 7, wherein the second set of antenna elements is less correlated than the first set of antenna elements.

12. The method of claim 7, wherein the second set of antenna elements is more correlated than the first set of antenna elements.

13. The method of claim 7, wherein modifying the configuration of the set of antenna elements from the at least one antenna panel is further based on one or more parameters of the one or more devices that are scheduled for communications by the first device.

14. The method of claim 7, further comprising modifying the configuration of the set of antenna elements from the at least one antenna panel to include a different set of antenna elements where the one or more devices move location with respect to the first device.

15. An apparatus for wireless communication, comprising:
- a set of antenna elements across multiple antenna panels including one or more sets of co-located dual-polarized antenna elements and one or more sets of non-co-located dual-polarized antenna elements;
- a transceiver coupled to the set of antenna elements;
- a memory configured to store instructions; and
- one or more processors communicatively coupled with the memory and the transceiver, wherein the one or more processors are configured to:
  - modify, based on a condition, a configuration of the set of antenna elements from at least one antenna panel of the multiple antenna panels to use in wireless communication, the condition relating to a thermal condition at the apparatus, wherein modifying the configuration of the set of antenna elements includes switching from a first set of co-located dual-polarized antenna elements to a second set of non-co-located dual-polarized antenna elements; and
  - communicate with one or more devices using the modified configuration of the set of antenna elements from the at least one antenna panel.

16. The apparatus of claim 15, wherein the one or more processors are further configured to determine the condition at least in part by determining that a thermal value related to the thermal condition achieves a threshold thermal value.

17. The apparatus of claim 16, wherein the one or more processors are further configured to modify, based on determining that the thermal value no longer achieves the threshold thermal value, the configuration of the set of antenna elements from the at least one antenna panel to switch from the second set of non-co-located dual-polarized antenna elements to the first set of co-located dual-polarized antenna elements.

18. The apparatus of claim 15, wherein the one or more processors are configured to modify the configuration of the set of antenna elements from the at least one antenna panel further based on one or more parameters of the one or more devices that are scheduled for communications by the apparatus.

19. The apparatus of claim 18, wherein the one or more parameters include a location of the one or more devices, and wherein the one or more processors are configured to modify the configuration of the set of antenna elements from the at least one antenna panel based on performance difference between a first set of co-located dual-polarized antenna elements and a second set of non-co-located dual-polarized antenna elements.

20. The apparatus of claim 15, wherein the one or more processors are further configured to modify the configuration of the set of antenna elements from the at least one antenna panel to include a different set of antenna elements where the one or more devices move location with respect to the apparatus.

21. An apparatus for wireless communication, comprising:
- a set of antenna elements across multiple antenna panels including one or more sets of co-located dual-polarized antenna elements and one or more sets of non-co-located dual-polarized antenna elements;
- a transceiver coupled to the set of antenna elements;
- a memory configured to store instructions; and
- one or more processors communicatively coupled with the memory and the transceiver, wherein the one or more processors are configured to:
  - modify, based on a condition, a configuration of the set of antenna elements from at least one antenna panel of the multiple antenna panels to use in wireless communication, the condition relating to receiving, at the apparatus, rate or diversity parameters reported to the apparatus by a device, wherein the one or more processors are configured to modify the configuration of the set of antenna elements from the at least one antenna panel at least in part by switching from a first set of antenna elements in a first set of co-located dual-polarized antenna elements to a second set of antenna elements in the first set of co-located dual-polarized antenna elements, wherein the second set of antenna elements is one of less correlated than or more correlated than the first set of antenna elements; and
  - communicate with one or more devices using the modified configuration of the set of antenna elements from the at least one antenna panel.

22. The apparatus of claim 21, wherein the second set of antenna elements are physically spaced apart by a threshold inter-antenna element separation distance.

23. The apparatus of claim 21, wherein the rate or diversity parameters include an indication, from the device, of an angular spread corresponding to a dominant cluster in a channel between the apparatus and the device.

24. The apparatus of claim 21, wherein the rate or diversity parameters include channel conditions reported by the device or sensed by the apparatus.

25. The apparatus of claim 21, wherein the second set of antenna elements is less correlated than the first set of antenna elements.

26. The apparatus of claim 21, wherein the second set of antenna elements is more correlated than the first set of antenna elements.

27. The apparatus of claim 21, wherein the one or more processors are configured to modify the configuration of the set of antenna elements from the at least one antenna panel further based on one or more parameters of the one or more devices that are scheduled for communications by the apparatus.

28. The apparatus of claim 21, wherein the one or more processors are further configured to modify the configuration of the set of antenna elements from the at least one antenna panel to include a different set of antenna elements where the one or more devices move location with respect to the apparatus.

* * * * *